Oct. 18, 1938.  P. NEŠPOR  2,133,713
PROCESS FOR THE PRODUCTION OF COLOR FILMS AND COLOR PHOTOGRAPHS
Filed May 23, 1935
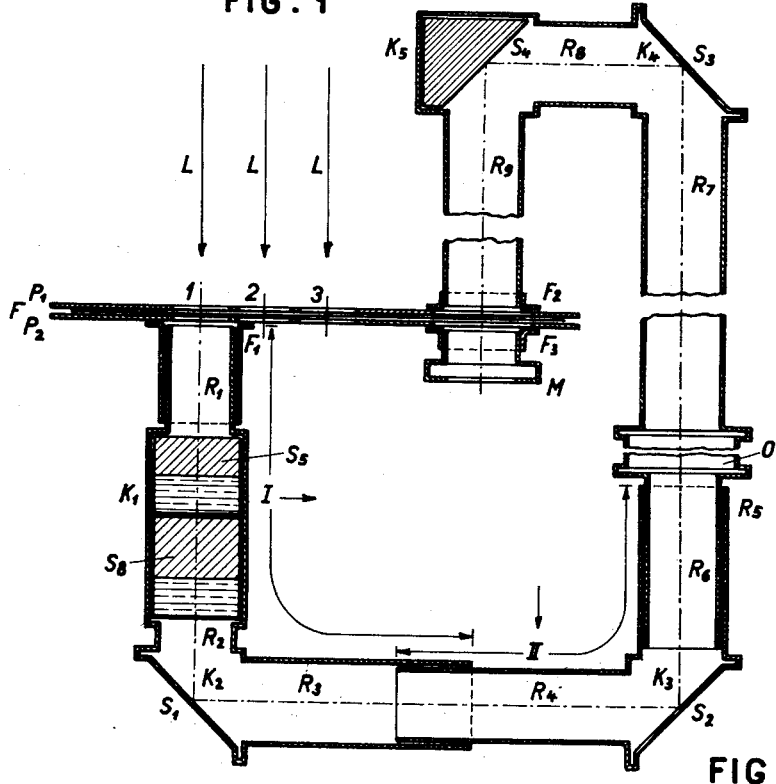
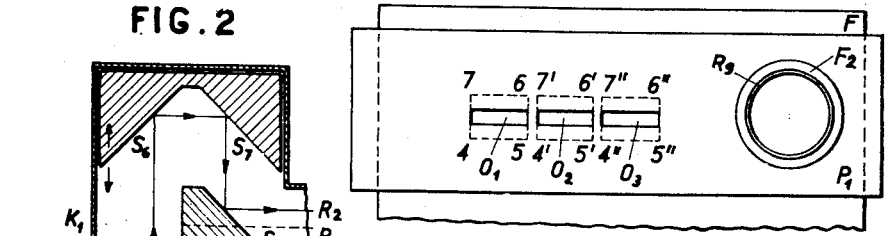
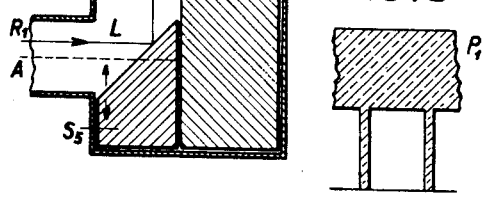
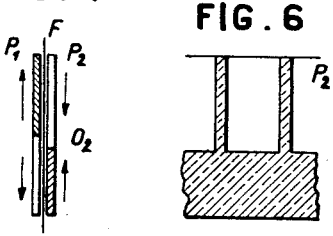
By his Attorney
Inventor
Peter Nešpor
John A. Seifert

UNITED STATES PATENT OFFICE 2,133,713

PROCESS FOR THE PRODUCTION OF COLOR FILMS AND COLOR PHOTOGRAPHS

Peter Nešpor, Vienna, Austria

Application May 23, 1935, Serial No. 22,956
In Austria May 29, 1934

7 Claims. (Cl. 88—24)

This invention relates to an improved method of and apparatus for producing colored films or colored photographs, in which three or more partial images of a complete color image or image group are copied photographically one superposed on the other. The original color image or image group and the copied partial images can be arranged either on a common diapositive or transparent support or film strip, on two transparent supports or film strips connected together by adhering one to the other, or on two transparent separated supports or film strips which are fed or moved in synchronism.

The exact copying of a partial image superposed on another partial image of three or more diapositive partial images of a complete color image or image group is effected by a system of fixed and adjustable mirrors or prisms and a photographic objective or lens which permit changing the position as well as the size of the partial images. By magnifying or contracting, or by adjusting or turning the partial images, it is possible in a very simple manner to register or aline the corresponding copies of the partial images exactly one superposed on the other, as is necessary in practice.

As with the great number of images of such a color film photograph this registering can be accomplished only by an automatic adjustment and rectification of the optical images of the original partial images, and it is indispensable that each partial image of a complete image corresponding to a definite color tone be brought into an uniform position parallel to the three partial images of the original image. This is effected by the original and copy having either, as stated, a common transparent support or two synchronously operating supports, and said support or supports being at both sides of the photographic lens at a distance of twice the focal length of the lens. In consequence of this arrangement only the adjustment and rectification by hand of the two optical images of the original image group is necessary to have an accurate automatic copying of one partial image superposed on another partial image of the series of partial images.

In the drawing accompanying and forming a part of this application there is shown diagrammatically by way of example an embodiment of apparatus for carrying out the method, wherein Figure 1 shows an arrangement in which the original and copy are carried by a common support or film strip and showing an adjustable mirror system taken on the line A—B of Figure 2.

Figure 2 is a sectional view on an enlarged scale of an adjustable mirror or prism system.

Figure 3 is a view of a film strip relative to opaque plates having a series of transparent portions to expose three partial images of a complete image printed on the film and permit copying of a composite image of said partial images on the film.

Figure 4 is a view of the film strip between said opaque plates indicating adjustment of said plates for varying the size of the partial images to be photographed; and Figures 5 and 6 are sectional views of the adjustable plates.

In accordance with the disclosure of Figure 1, the three color diapositive copy is produced on the same film strip which supports the original. The original is negative and consists of a series of three partial images in succession corresponding to the colors of yellow, red and blue, as indicated at 1, 2 and 3, and constituting one complete color image. The three color diapositive copy is produced by first transcribing from the original the partial image 1 and then coating the portion of the film having the transcribed partial image 1 with a layer of light sensitive emulsion. On this layer of light sensitive emulsion there is produced the color image corresponding to the partial image 2. This process of copying the partial images superposed to each other is continued with the partial image 3, resulting in a series of superposed partial images separated by layers of light sensitive emulsion. The superposed partial images prepared in this manner is now separated from the original and the latter is joined to a film strip intended for the next three color composite copy. It is possible to proceed more economically and avoid the joining of the original to the film strip intended for the three color composite copy, by employing as the original a diapositive having the three color series of images arranged in succesison and copying by the use of corresponding filters each of these images on the other two images. By means of reversing baths the copied series of images are made diapositive and then toned in the corresponding colors so that in this way a diapositive three color film copy is produced from the three partial images arranged in a successive series.

A preferred universal type of copying or printing device for the carrying out of the process according to the present invention is shown in Figs. 1 and 2 of the accompanying drawing, and consists essentially of a system of cylindrical tubes $R_1$, $R_2$, $R_3$, $R_4$, $R_5$, $R_6$, $R_7$, $R_8$, and $R_9$ between which there are interposed the mirror chambers $K_1$, $K_2$, $K_3$, $K_4$, $K_5$, and the photographic lens O.

The position and focal length of the lens, and the lengths of the tubes $R_7$ and $R_9$, are so determined that the paths of the axial ray from the original to the optical centre of the lens on the one hand, and from the optical centre of the lens to the diapositive copy on the other hand, are equal to twice the focal length of the lens.

The mirror chambers $K_1$, $K_2$, $K_3$, $K_4$, and $K_5$ (see Figs. 1 and 2) are divisible into two groups, namely into those having fixed reflecting surfaces and those having movable reflecting surfaces. The former group comprises the mirror chambers $K_2$, $K_3$, and $K_4$ (Fig. 1) which represent hollow three-sided prisms of metal or other suitable material of which the one vertical side wall is rendered capable of reflecting by being coated with a silver layer. The reflecting surfaces thus obtained, which are denoted by $S_1$, $S_2$, and $S_3$, are therefore disposed in vertical planes which form an angle of 45° with the vertical plane of the film strip F and with the horizontal parallel light rays L.

In contrast to the above-described group, the mirror chambers $K_1$ and $K_5$ constituting the second group are provided with special reflecting bodies. The mirror chamber $K_1$ is a rectangular hollow prism of metal or other suitable material into which, as shown in vertical section in Fig. 2 and in horizontal section taken on the line A—B of Fig. 2, in Fig. 1, there are built three prismatic reflecting bodies one of which having the reflecting surface $S_8$. The mirror bodies carrying the mirror surfaces $S_5$ and $S_6$—$S_7$ can be adjusted in a vertical direction, as indicated by the arrows, by any suitable means, such as screws, which are not shown in the drawing to maintain a clear disclosure of the diagrammatical arrangement of the apparatus. As the mirror surfaces $S_5$ and $S_6$—$S_7$ are inclined toward the vertical axis of the mirror chamber $K_1$ at an angle of forty-five degrees, an adjusting movement of the mirror surface $S_5$ will move the optical image in a vertical direction without changing the lengths of the parallel rays of light. By a vertical adjustment of the double mirror $S_6$—$S_7$, the distance of the original image from the optical center of the photographic objective or lens can be changed. The mirror chamber $K_5$, as shown in Figure 1, is in the form of a hollow cylinder of metal or similar material in which there is mounted a similar cylinder having a mirror surface $S_4$ formed by a reflecting layer of silver. The chamber $K_5$ and mirror surface $S_4$ are rotatable about the axes of the cylinders whereby the angle of the elliptical surface section $S_4$ together with the light rays and the angle of the optical image to the vertical can be changed. To properly transmit the photographed image the mirror surface $S_4$ must extend parallelly to the mirror surface $S_2$ of the mirror chamber $K_3$. In normal position the reflecting surface $S_4$ is parallel to the reflecting surface $S_2$ of the mirror chamber $K_3$.

The adjusting and rectification of the optical image is effected in the following manner. The tubes $R_3$, $R_4$, and $R_5$, $R_6$ (Fig. 1) are so mounted that the part I of the copying device can be moved parallel, while the parts I and II of the same can be moved at right angles to the vertical plane of the film strip F. This adjustability of the copying device permits of the displacement of reflected images horizontally in front of the lens without altering the length of the paths of the individual light rays.

If it should be necessary to displace a reflected image in a vertical direction also, without altering the length of the paths of the individual light rays, this can be effected, as shown in Fig. 2, by moving the reflecting surface $S_5$ in one of the directions indicated by the arrows.

The obtaining of coincidence between the reflected images or optical images of three corresponding points on the negative pictures rarely brings about also coincidence between the three corresponding component negative pictures. It is generally necessary to obtain coincidence between the three optical images by displacement of the double mirror $S_6$—$S_7$ (Fig. 2) in the directions indicated by the arrows or by bringing the picture axes into alignment by rotation of the elliptical mirror $S_4$ about the axis of the tube $R_9$. The coincidence of the optical images (diapositive picture copies) of three negative component pictures pertaining to one color picture is checked through the microscope M (Fig. 1).

The following is an example of how the optical images can be displaced in a horizontal sense. Referring to Fig. 1, the reference characters 1, 2, and 3 denote three corresponding points on three negative component pictures pertaining to one group of pictures the images of which are to be brought into register or into one and the same vertical plane by means of horizontal displacement. Fig. 1 is intended to represent the basic position of the copying device in which the optical image (copy) of the negative picture point 1 is produced. If the optical image of the point 2 on the negative is to be brought into register or at least into one vertical plane with the diapositive copy of the point 1, then the part I must be moved in the direction indicated by the arrow at I through the distance 1—2 parallel to the vertical plane of the film strip F, and after the part I has been fixed in position the parts I and II must be displaced at right angles to the vertical plane of the film strip F, as indicated by the arrow at II, through half the distance between 1 and 2. The optical image of the point 3 on the negative can be displaced in an analogous manner.

The process of photographic copying is as follows. The photographic copying is carried out, with continuously traveling film strip F (Fig. 1), by means of parallel light rays L disposed at right angles to the glass plates $P_1$ and $P_2$ between which the film F is drawn. These plates are so coated on the side towards the film with a layer of material impervious to light (see Figs. 5 and 6; in the transverse sections shown in Figs. 1 and 2 the opaque portions of the glass plates $P_1$ and $P_2$ are shown as thick black lines for the sake of clearness) that the parallel light rays L (Fig. 1), after passing through the glass plates $P_1$ and $P_2$, form beams of rays the rectangular cross-sectional configuration of which is shown at $O_1$, $O_2$, and $O_3$ in Fig. 3. Since the height of these rectangles only amount to a fraction of that of the negative component pictures, which are denoted in Fig. 3 by 4, 5, 6, 7, 4', 5', 6', 7', and 4'', 5'', 6'', 7'', respectively the obtaining of copies free of distortion is assured.

The arrows shown in Fig. 4 indicate that the glass plates $P_1$ and $P_2$ are vertically adjustable, for the purpose of varying the cross-section of the beams of rays and with it the length of exposure with the same rate of movement of the film. In order to obtain perfectly light-tight closure of the copying apparatus, there are provided three flanged sleeves F₁, F₂, and F₃ (Fig. 1) and a cap for the microscope M. The flanged sleeves are screw threaded and their flanges can be tightened down on to the glass plates to form a light-tight joint.

I claim:

1. The method of producing colored photographic images, which comprises providing a transparent carrier, arranging thereon images of originals grouped in parallel rows and a sensitized film extending parallelly of the rows of images, and photographing successively the images of one row in register with the images of another row on the sensitized film on the carrier.

2. A method for the reproduction of colored photographs and kinematographic films, which comprises providing a transparent carrier, attaching partial images of a complete image in a row on said carrier, attaching a sensitized film to said carrier parallelly of the row of partial images, and then photographing successively the row of images onto the sensitized film on the carrier.

3. The method of producing colored photographs and kinematographic films, consisting in providing a web of transparent film having arranged thereon successive partial original images and a sensitized surface, and photographing successively the partial images in register with each other on the sensitized surface.

4. The method of producing colored photographs and kinematographic films, which comprises providing a web of transparent material, attaching to said web a transparent strip having arranged thereon rows of partial images of complete images and a sensitized film strip to extend parallelly of and on which the complete images are to be produced, photographing the partial images of one row on the sensitized film strip, and then successively photographing on the film strip the partial images of the other rows in register with the partial images of the first row.

5. The method of producing colored photographs and kinematographic films, consisting in providing a web of transparent material, arranging thereon a row of original images, adhering a sensitized film to the transparent web of material to extend parallelly of the row of images, moving the web of transparent material continuously, and during the movement of said web of material photographing successively the row of images onto the sensitized film.

6. The method of producing colored photographs and kinematographic films, which comprises providing a web of transparent material, arranging thereon partial images of complete images in parallel rows and a sensitized surface extending parallelly of the rows of partial images, continuously moving the web of transparent material and simultaneously photographing successively the partial images of one row of partial images on the transparent web of material onto the sensitized surface, and then successively photographing the partial images of the other rows onto the sensitized surface in register with the partial images of the first row.

7. The method of producing colored photographs and kinematographic films, which comprises providing a web of transparent material, arranging on said material parallel rows of partial images of complete images and a sensitized surface to extend parallelly of the rows of partial images, photographing successively the partial images of one row of images onto the sensitized surface, providing said photographed partial images on said sensitized surface with a layer of light sensitive emulsion, photographing successively the partial images of another row of images onto said sensitized coating in register with the first images, providing the second photographed images with a layer of light sensitive emulsion, and then photographing successively the partial images of the remaining row of partial images onto the last applied layer of sensitive emulsion in register with the other images.

PETER NEŠPOR.